(12) United States Patent
Hsu

(10) Patent No.: US 7,997,724 B1
(45) Date of Patent: Aug. 16, 2011

(54) ILLUMINATED EYEGLASS

(75) Inventor: Chan-Hsin Hsu, Tainan (TW)

(73) Assignee: Sun and Young Sunglasses Co., Ltd., Tainan (TW)

( * ) Notice: Subject to any disclaimer, the term of this patent is extended or adjusted under 35 U.S.C. 154(b) by 0 days.

(21) Appl. No.: 12/789,950

(22) Filed: May 28, 2010

(51) Int. Cl.
*G02C 1/00* (2006.01)
(52) U.S. Cl. .......................... 351/158; 351/121
(58) Field of Classification Search .................. 351/41, 351/111, 121, 158
See application file for complete search history.

(56) References Cited

U.S. PATENT DOCUMENTS

| 7,784,935 B2 * | 8/2010 | Jackson et al. | 351/158 |
| 2011/0075095 A1 * | 3/2011 | Waters | 351/158 |

* cited by examiner

*Primary Examiner* — Huy K Mai
(74) *Attorney, Agent, or Firm* — Rosenberg, Klein & Lee

(57) ABSTRACT

This invention relates to an illuminated eyeglass, in which temple arms are respectively hinged on both sides of frame, and lighting apparatuses are provided in the interiors of the temple arms. The light emitting bodies of the lighting apparatuses are disposed in front ends of the temple arms such that the direction of light beam emitted from the light emitting bodies is in conformity with user's view direction. Additionally, the switch members for the lighting apparatuses are projected out to the flanks of the temple arms so that users are easy to operate the switch members to turn on the light emitting bodies. In this manner, the eyeglass can fully display the benefit of helping the people to see clearly all things around.

1 Claim, 3 Drawing Sheets

ILLUMINATED EYEGLASS

BACKGROUND OF THE INVENTION

1. Field of Invention

This invention relates to an illuminated eyeglass, more particularly to an illuminated eyeglass which can emit light beam in conformity with user's view direction so as to help the people to see clearly all things around.

2. Brief Description of the Prior Art

Eyeglass haves functions of correcting vision abnormalities such as myopia, hyperopia, and astigmatism of various level. Users can wear eyeglasses to help seeing things clearly.

However, eyeglass having good vision correction functions might fail to function very well in case of deficiency in light. People can see clearly all the ambience and the matters in process with the assistance of sunshine illuminating in daytime or lamp illuminating in night time. As lamp cannot be installed everywhere to provide sufficient illumination, people often fail to see clearly the things around in gloomy room with dim light. In such circumstance, people are especially strenuous in reading or doing documentation work which usually requires much more eyesight.

Accordingly, concerned industry has developed an eyeglass incorporated with light apparatus disclosed in Taiwanese Patent Gazette No. M310347 entitled "Eyeglass having lighting apparatus", in which a lighting apparatus is attached to a temple arm hinged on eyeglass frame. The lighting apparatus is formed by a snap-fit seat and a lamp seat, in which a projecting lug of the lamp seat is served as a packing positioned to be inserted into a groove of the snap-fit seat, and a blocking segment of the snap-fit seat prevents the projecting lug from loosening. Further, a notch of each snap-fit seat and the curling upward posture of the same are to enhance its elasticity and to cause deformation so that the clip shape side edge is pressed to clip and position onto the temple arm. In this manner, users can adjust the lamp seat to any desired angle and press the switch button disposed on the outside of the lamp seat so as to ON-OFF the power source. Hence, it is easy to operate the lighting apparatus so that the light emitting body of the lighting apparatus can be driven to illuminate light to location with inadequacy in light.

However, as the lighting apparatus of the "Eyeglass having lighting apparatus" disclosed in Taiwanese Patent Gazette No. M310347 is externally-mounted type, which can not be integrated with eyeglass, and moreover, which detracts from the overall appearance of eyeglass. In addition, as there is unbalance in weight on both sides, users are liable to suffer pain after long-time wearing. As the lighting apparatus is externally mounted and can be separated, users often forget to put the lighting apparatus on the eyeglass such that there is no light apparatus available in case of need.

In view of the abovementioned disadvantages, the inventor the present invention hereby proposes a novel illuminated eyeglass based on his proficient experience and knowledge in R&D and manufacturing in relevant field, and according to his endless research.

SUMMARY OF THE INVENTION

The main purpose of this invention is to provide an illuminated eyeglass which can emit light beam in conformity with user's view direction so as to help the people to see clearly all things around.

In order to achieve above object, the illuminated eyeglass of the present invention comprises an eyeglass frame, temple arms, and lighting apparatuses, wherein:

the eyeglass frame is formed with hollow-out troughs for assembling lenses therein, two hinge blocks being provided respectively on both sides of the eyeglass frame;

the temple arms being located on both sides of the eyeglass frame respectively, each temple arm being formed with an accommodation space in its interior; a fixed cover plate and a removable cover plate being correspondingly provided for closing the accommodation space, each fixed cover plate being fixed on the temple arm by a fastening member, and a through hole being commonly formed on both the front ends of the fixed cover plate and the accommodation space; the fixed cover plates having hinge blocks formed behind the through holes, which are respectively engaged with the hinge blocks of the eyeglass frame; a slot penetrating out to the flank of each temple arm being provided on the accommodation space; a projecting tab being formed on the front end of the removable cover plate for inserting thereunder; a snap-fit block having bended shape being formed on the rear end of each removable cover plate, which is engaged in an arresting groove provided on the rear end of each accommodation space;

the lighting apparatuses are assembled in the accommodation spaces of the temple arms, which have battery mounting seats positioned oppositely to the removable cover plates, batteries being disposed within the battery mounting seats; a circuit board being electrically connected to each battery mounting seat, which is positioned oppositely to the fixed cover plate; a switch member being provided on each circuit board, which is extended out of the slot; a light emitting body being electrically connected on the circuit board and being located on the through hole formed commonly by the front ends of the fixed cover plate and the accommodation space.

In this manner, as the light beam emitted from the light emitting bodies are projecting out from the through holes provided at the front ends of the temple arms, the direction of light beam emitted from the light emitting bodies are in conformity with user's view direction such that users can change view direction at will without illumination effect being changed. In addition, the switch members of the lighting apparatuses of the present invention are arranged to extend out to the flanks of the temple arms such that users can operate the switch member very smoothly and conveniently so as to turn on the light emitting bodies. In this manner, the illuminated eyeglass of the present invention can fully display the benefit of helping the people to see clearly all things around and to conduct documentation work.

Furthermore, the lighting apparatuses are arranged on the front sections of the temple arms, and the rear sections of the temple arms are maintained in flat and thin. In this manner, the rear sections of the temple arms can be worn comfortably and stably on user's ears so as to achieve wearing stability.

DETAILED DESCRIPTION OF PREFERRED EMBODIMENTS

The objects, the technical contents and the expected effect of the present invention will become more apparent from the detailed description of the preferred embodiment in conjunction with the accompanying drawings.

Figure 1:
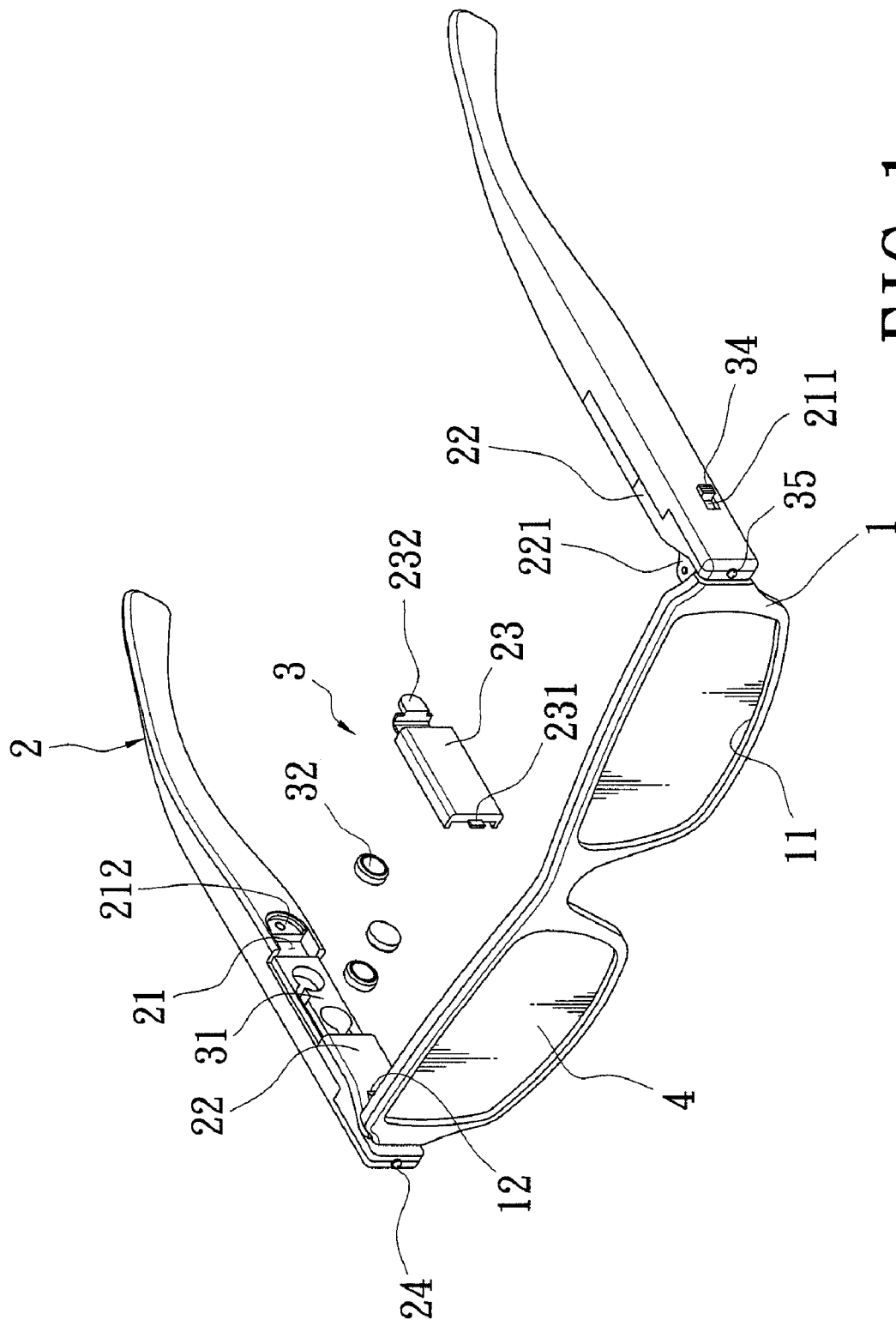
FIG. 1 is a perspective exploded view showing the illuminated eyeglass of the present invention.
Figure 2:
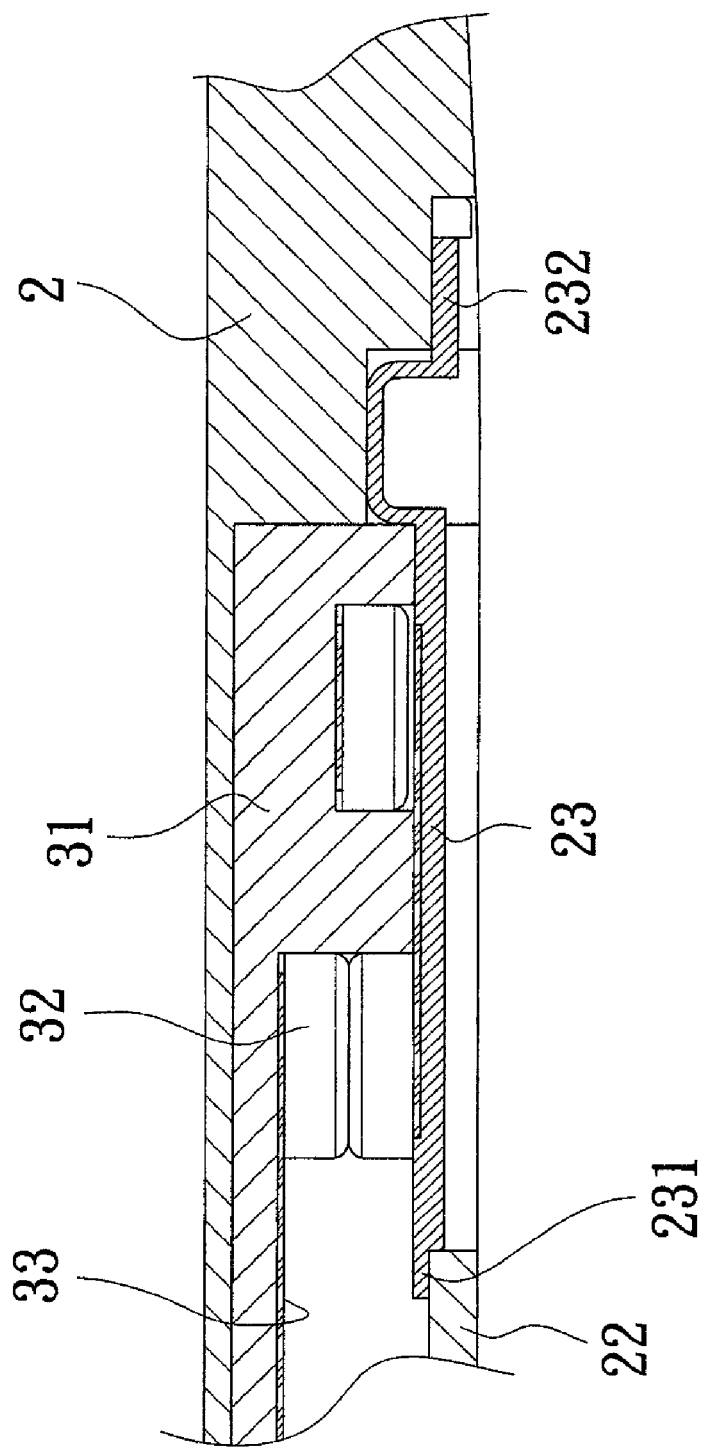
FIG. 2 is a partial enlarged sectional exploded view showing the lighting apparatus of the present invention.

Firstly referring to FIGS. 1 and 2, the illuminated eyeglass of the present invention comprises an eyeglass frame (1), temple arms (2) and lighting apparatuses (3).

The eyeglass frame (1) is formed with hollow-out troughs (11) for assembling lenses (4) therein. Two hinge blocks (12) are provided respectively on both sides of the eyeglass frame (1).

The temple arms (2) are located on both sides of the eyeglass frame (1) respectively. Each temple arm (2) is formed with an accommodation space (21) in its interior, and a fixed cover plate (22) and a removable cover plate (23) are correspondingly provided for closing the accommodation space (21). Each fixed cover plate (22) is fixed on the temple arm (2) by a fastening member, and a through hole (24) is commonly formed on the front ends of the fixed cover plate (22) and the accommodation space (21). Fixed cover plates (22) have hinge blocks (221) formed behind the through holes (24), which are respectively engaged with the hinge blocks (12) of the eyeglass frame (1). A slot (211) penetrating to the flank of each temple arm (2) is provided on the accommodation space (21). A projecting tab (231) is formed on the front end of the removable cover plate (23) for inserting thereunder. A snap-fit block (232) having bended shape is formed on the rear end of each removable cover plate (23), which is engaged in an arresting groove (212) provided on the rear end of each accommodation space (21).

The lighting apparatus (3) is assembled in the accommodation space (21) of each temple arm (2), which has a battery mounting seat (31) positioned oppositely to the removable cover plate (23). Batteries (32) are disposed within the battery mounting seat (31). A circuit board (33) is electrically connected to each battery mounting seat (31), which is positioned oppositely to the fixed cover plate (22) so as to form a stable assembly. A switch member (34) is provided on each circuit board (33), which is extended out of the slot (211). A light emitting body (35), typically a LED, is electrically connected on each circuit board (33) and is located in the through hole (24) formed commonly by the front ends of the fixed cover plate (22) and the accommodation space (21).

Figure 3:
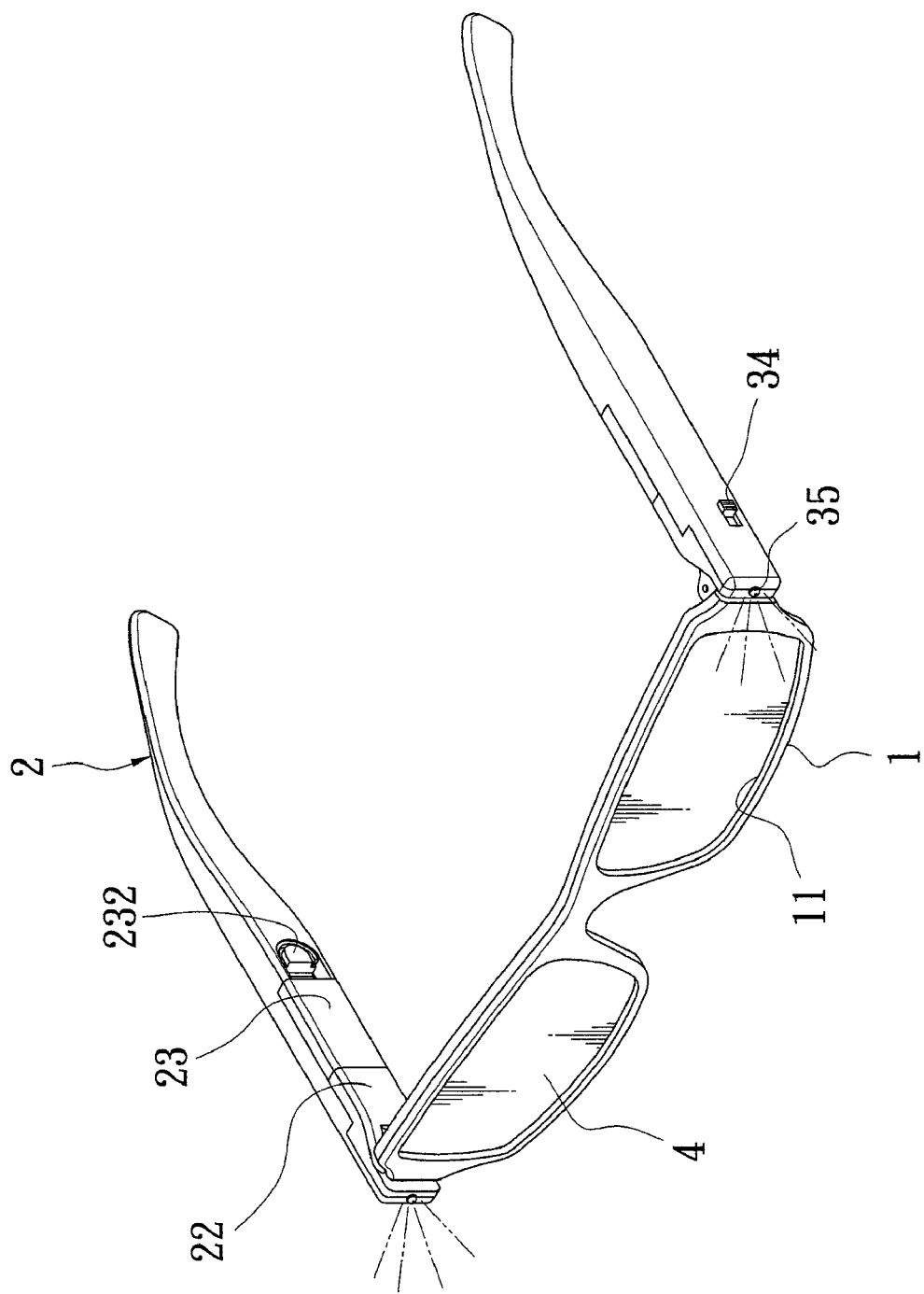
FIG. 3 is a view showing the illuminated eyeglass in use state.

In this way, when users want to see clearly things around in dim light room or environment or to read or to conduct documentation work, referring to FIGS. 1 to 3, they can operate the switch members (34) extending out of the flanks of the temple arms (2) so as to actuate the light emitting bodies (35) to radiate light. The light emitted from the light emitting bodies (35) is projected out from the through holes (24) at the front ends of the temple arms (2) so as to provide illumination for environment. Accordingly, users can walk smoothly in dim street, search desired stuffs in dark room or barn with the assistance of illumination provided by the light emitting body (35). As the light beam emitted from the light emitting bodies (35) is projecting out from the through holes (24) provided at the front ends of the temple arms (2), the direction of light beam emitted from the light emitting bodies (35) is in conformity with user's view direction such that users can change view direction at will without illumination effect being changed. In this manner, the illuminated eyeglass of the present invention can fully display the benefit of helping the people to see clearly all things around and to conduct documentation work.

As the light apparatuses (3) of the eyeglass of the present invention are assembled on front sections of the temple arms (2) in balanced condition and the rear sections of the temple arms (2) maintain flat and thin for wearing easily on the ears of users, the eyeglass can be worn comfortably on user's ears unlike the case of disadvantageously wearing eyeglass having thickened ends on temple arms (2). Furthermore, the sequential arrangement of the light emitting bodies (35), the switch members (34), the circuit boards (33), the battery mounting seats (31) and the batteries (32) results in relatively balanced condition such that users have no such discomfort feeling as in the case of unbalanced arrangement. Moreover, as the lighting apparatuses (3) are provided internally in the temple arms (2), the overall design of the eyeglass can be maintained in contemporary aesthetic profile, unlike the case of detracting from overall appearance by providing lighting apparatus of externally mounted type, hence, consumers being fond of delicacy and contemporary design can be attracted to purchase. In addition, as the lighting apparatuses (3) are provided in the interiors, instead of exteriors, of the temple arms (2), there is not such case that users want to use light but no light apparatus being available.

Moreover, though the lighting apparatuses (3) are provided in the interior of the temple arms (2), replacement of batteries (32) is very convenient. The snap-fit block (232) having elastic property is pulled inwardly so as to detach from the engagement in the arresting groove (212), the removable cover plate (23) can be removed so as to expose the battery mounting seat (31) and the batteries (32). Hence, the batteries (32) can be replaced conveniently. After replacement of batteries (32), the projecting tab (231) of removable cover plate (23) is inserted under the removable cover plate (23), and then the removable cover plate (23) is pressed down so that the snap-fit block (232) is engaged in the arresting groove (212) for interlocking therewith. Therefore, the replacement of batteries (32) is apparently convenient.

Based on the foregoing, the present invention has the advantages set forth below.

1. As the light beam emitted from the light emitting bodies are projecting out from the through holes provided at the front ends of the temple arms, the direction of light beam emitted from the light emitting bodies is in conformity with user's view direction such that users can change view direction at will without illumination effect being changed. In this manner, the illuminated eyeglass of the present invention can fully display the benefit of helping the people to see clearly all things around and to conduct documentation work.

2. The switch members of the lighting apparatuses of the present invention are arranged to extend out to the flanks of the temple arms. Hence, users can operate the switch members very smoothly and conveniently so as to turn on the light emitting bodies.

3. The lighting apparatuses are arranged on the front sections of the temple arms in balanced manner, and the rear sections of the temple arms are maintained in flat and thin so as to be worn comfortably on user's ears and to achieve wearing stability.

4. As the lighting apparatuses are provided internally in the temple arms without detracting feeling. Hence, consumers fond of delicacy and contemporary design can be attracted to purchase.

5. As the lighting apparatuses are provided in the interiors, instead of exteriors, of the temple arms, there is not such case that users want to use light but no light apparatus being available.

6. In the present invention, the removable cover plates of the lighting apparatuses are formed with projecting tabs on one ends, while snap-fit blocks having elastic property are formed on another ends. When batteries are to be replaced, the snap-fit block having elastic property is pulled inwardly so as to detach from the engagement in the arresting groove, then the removable cover plate can be removed so as to remove the used batteries and replace new ones. Hence, the batteries can be replaced conveniently.

What is claimed is:

1. An illuminated eyeglass, comprising an eyeglass frame, temple arms and lighting apparatuses, wherein:

said eyeglass frame is formed with hollow-out troughs for assembling lenses therein, two hinge blocks being provided respectively on both sides of said eyeglass frame;

said temple arms being located on both sides of the eyeglass frame respectively, each temple arm being formed with an accommodation space in its interior; a fixed cover plate and a removable cover plate being correspondingly provided for closing the accommodation space, each fixed cover plate being fixed on the temple arm by a fastening member, and a through hole being commonly formed on both the front ends of the fixed cover plate and the accommodation space; the fixed cover plates having hinge blocks formed behind the through holes which are respectively engaged with the hinge blocks of the eyeglass frame; a slot penetrating out to the flank of each temple arm being provided on the accommodation space; a projecting tab being formed on the front end of the removable cover plate for inserting thereunder; a snap-fit block having bended shape being formed on the rear end of each removable cover plate, which is engaged in an arresting groove provided on the rear end of each accommodation space;

said lighting apparatuses are assembled in the accommodation spaces of the temple arms, which have battery mounting seats positioned oppositely to the removable cover plates, batteries being disposed within the battery mounting seats; a circuit board being electrically connected to each battery mounting seat, which is positioned oppositely to the fixed cover plate; a switch member being provided on each circuit board, which is extended out of the slot, a light emitting body being electrically connected on the circuit board and being located in the through hole formed commonly by the front ends of the fixed cover plate and the accommodation space.

* * * * *